Patented Dec. 31, 1929

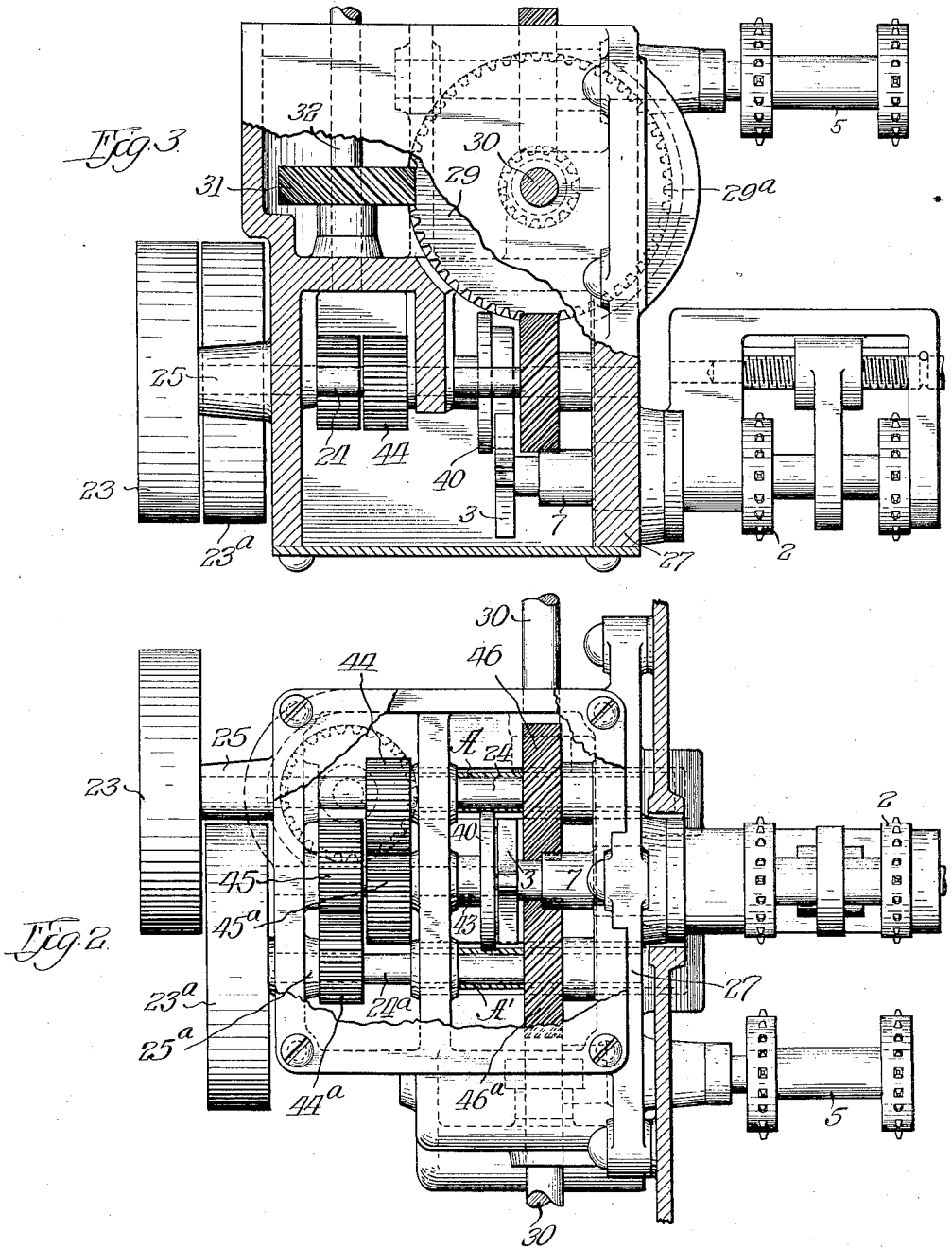

1,742,001

UNITED STATES PATENT OFFICE

FOREST RAY MOULTON, OF CHICAGO, ILLINOIS, ASSIGNOR, BY MESNE ASSIGNMENTS, TO ACME MOTION PICTURE PROJECTOR COMPANY, OF CHICAGO, ILLINOIS, A CORPORATION OF ILLINOIS

DRIVING MECHANISM FOR MOTION-PICTURE-PROJECTION MACHINES

Application filed October 4, 1922. Serial No. 592,415.

My present invention relates in general to such arts as kinetoscopy which employ intermittently moved devices, and more particularly apparatus utilizing an intermittent drive for causing certain parts thereof to come either into register or into predetermined relation in succession and has especial reference to the provisions which may be utilized with mechanism for intermittently moving and acting upon a strip of relatively fragile material, such as for the successive projection upon a screen of the members of a series of pictures borne by a photographic film strip.

While mechanism of the character referred to finds a wide field of utility, it is especially useful in connection with mechanism for drawing the photographic film employed in motion picture apparatus step-by-step into position before a source of light and then effecting projection of the consecutive film portions upon the screen whereupon the pictures are displayed.

Inasmuch as I have illustrated my present invention as embodied in a motion picture projection machine, I will premise that the film carries a series of pictures which are equally spaced and which are shown in succession; that there is a cycle corresponding to each picture on the film consisting of a short interval during which the film is moved into proper register with the opening in the frame arranged between the light source and projection lens, and another interval during which it is stationary and during at least part of which it is being projected onto a screen; that it is important in a machine of the character referred to not only that the step-by-step motion of the film be attained accurately, but also that acceleration of such motion be uniform and smooth in order that the successive portions thereof projected upon the screen be so projected as to register upon the screen as perfectly as possible to the end that the picture shown may be clear; and that such step-by-step movement of the film and the interposition of light-interrupting means (such as a revolving shutter) if such be employed, be so co-ordinated that the step-by-step motion of the film strip is effected during the eclipse of the light projection to the end that the bodily movement of the film strip may not be apparent to the spectators.

Motion picture projection machines known to me present certain features of mechanical difficulty, among which is that relating to the driving of the film in such manner and through so small a fraction of a cycle as may be attained so that the time during which a film is eclipsed by the shutter may be abbreviated as much as possible, even to the extent, as I seek, of the discontinuance of such eclipsing and that the motion of the film, when produced, may be produced with the use of a minimum of force so that the film may be subjected to a minimum of the strain and wear-and-tear which eventually, if it does not cause it to break, at least largely destroys its usefulness.

The principal objects of my present invention, therefore, involve, among other things, the provision of an improved intermittent motion device characterized by the application of a minimum force to the object actuated, one of relatively low minimum speed in attaining a given objective in a given time, one wherein the motion effected can be effected in as small a fraction of a cycle as may be desired, one which is smooth and balanced in operation, one which is adapted to bring certain parts of the material actuated into predetermined registry with given points and one which is susceptible of ready synchronization with associated parts of the mechanism.

In attaining the objects referred to and such further benefits and advantages as may be hereinafter pointed out, I have provided a mechanism, one embodiment of which is illustrated in the accompanying drawings, wherein—

Figure 2 is a view of Figure 1 looking in the direction of the arrows with a portion of the casing removed to show the parts beneath; and Figure 3 is a view similar to Figure 2 looking in a direction at a right-angle to that of Figure 2.

Figure 1:
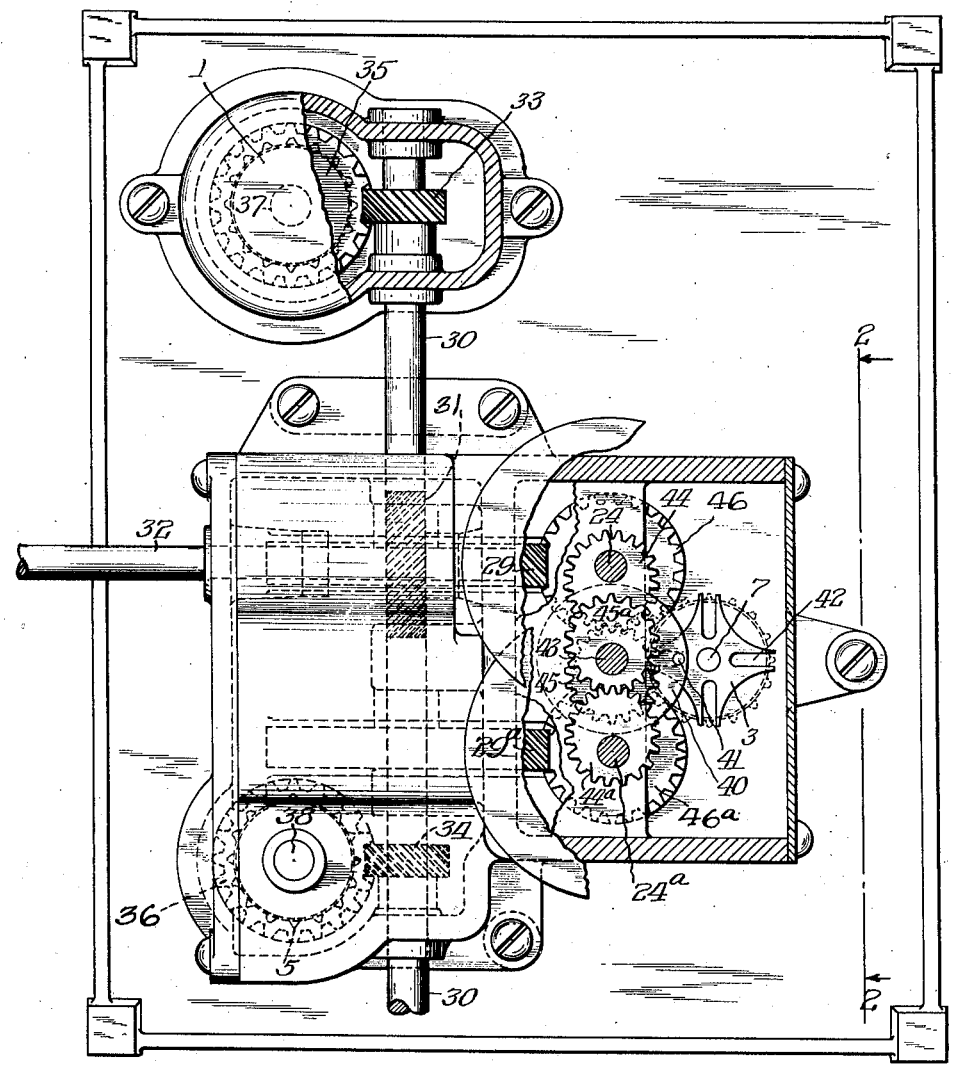
Figure 1 is an elevational view illustrative of part of motion picture projection machine embodying my present invention, the machine being viewed from one lateral aspect thereof with certain parts removed for the sake of clarity.

In order that the nature of my invention as applied to a motion picture projection machine may be clearly understood, I will further premise (a) a typical motion picture machine employing in general the practice which is at present approved, and (b) what are considered the essential features of the intermittent driving mechanism and the framing mechanism employed therein.

A typical motion picture projection machine includes a double sprocket, 1, driven at a uniform speed, which by virtue of its teeth engaging marginal perforations on both edges of the film (not shown) draws such film from a holding reel (not shown) and delivers it into position to be passed through the machines, that is, before the projection light (not shown). There is also employed a double sprocket, 2, which is driven intermittently by suitable mechanism. This mechanism usually includes a "star wheel" of the general form of the Geneva cross, having a plurality of slots. In machines employing my present invention, I employ an improved form of intermittent driving mechanism including elliptical gearing and a "star wheel" hereafter to be described.

A revolving shutter structure (not shown) is interposed between the part of the film which passes in front of the projection light and the screen. The intermittent motion device, just referred to, is so driven and so related to the shutter that the portion of the film which is exposed to the light, and which is projected on the screen, is stationary while the shutter is "open" and is moved only while the shutter is "closed". A third sprocket, 5, driven at a uniform speed, is commonly employed to deliver the film, as it passes through the machine after projection upon the screen to a winding-up reel (not shown).

The several double sprockets, 1, 2, and 5 are provided with teeth normally about one-sixth of an inch apart, which engage in corresponding perforations adjacent to the margins of the film. The vertical width of each picture on the film is about three-quarters of an inch, and consequently there are a number of such marginal perforations on each edge of the film, corresponding to each picture thereon.

It will, of course, be understood on reference to the figures of the drawings that for driving the mechanism here illustrated, I may employ any source of power such as a motor for rotating the shaft 30 which carries the driving pinions 29 and $29^a$, the pinion 29 meshing with the pinion 31 on the shaft 32 which carries the shutter structure.

The shaft, 30, also carries pinions 33 and 34, driving gears 35, 36 on shafts 37, 38, on which are mounted the sprockets 1 and 5, respectively, (see Figures 1 and 2).

Referring now more particularly to the mechanism employed by me for intermittently driving the sprocket, 2, it should be borne in mind that the film strip carries a series of equally spaced pictures which are shown in succession, and that there is a time cycle, corresponding to each picture on the film, consisting of a relatively short interval, during which the film is moved, and a relatively long interval, during which it is stationary.

As will be understood on reference to Figure 1 of the drawings, the film is moved through the medium of a train of gearing, including the said shaft, 7, upon which said star-wheel, 3, is non-rotatably mounted, and that said star-wheel, 3, is driven by a constantly but not uniformly rotating driving element, 40, through the medium of a pin, 41, successively engaging the several slots, 42, of the star-wheel, and that the force exerted on the film by the sprocket, 2, is directly proportional to the angular acceleration of the star-wheel, since the linear acceleration of the film, which is proportional to the force, is proportional to the angular acceleration of the sprocket.

For imparting motion to the constantly rotating driving element, 40, mounted on the shaft, 43, I employ two pairs of gears, 44, $44^a$, the gears 44, and $44^a$ being mounted on the shafts, 24 and $24^a$, respectively, and the gears 45 and $45^a$ being both mounted on the shaft 43, the gear 44 meshing with the gear 45 and the gear $44^a$ meshing with the gear $45^a$. The shafts 24 and $24^a$ are rotated by the engagement of the pinions 46 and $46^a$ carried by the shafts 24 and $24^a$, respectively, with the driving pinions 29 and $29^a$ respectively.

In order that the increments of movement of the star-wheel, 3, may be accomplished in a proportionately very short period of the cycle of operation of the driving mechanism, I employ for the gear members, 44, $44^a$ and 45, $45^a$ pairs of elliptic gears, so arranged with reference to the drive, 41, and slots of the star-wheel, 3, that motion is imparted to the star-wheel, 3, during the time that the peripheries of the gears 44 and 45 are making the most rapid portion of their revolution around the shaft, 43. It will, therefore, be apparent that the shaft, 24, may be driven at a constant speed and that the acceleration and deceleration of the shaft 43 and consequently the movement of the star-wheel, 3, within such short period of time, may be accomplished without variation of the cycles of any of the other driven elements of the mechanism or interference with their predetermined synchronization.

By the employment of the improved form of combined elliptical gearing and star-wheel of my present invention, the motion can be made in as small a fraction of the whole cycle as may be desired and the force applied on the film is constant, and, therefore, it is the minimum force which can move the film the required distance in the required time. One advantage of having the film moved during only a small fraction of a cycle is that it is then necessary to have the light eclipsed only a small fraction of a cycle. This makes it possible to project more light onto the screen and to reduce correspondingly (1) the candle power of the source, (2) the heat in the machine, and (3) the heat of the film while it is being exposed. When the motion takes place in one-eighth of a cycle, for example, the efficiency of the light is twice that when a Geneva form star-wheel is used. A second and paramount advantage is that when the film is moved during only one-twelfth of a cycle, it is feasible, and I have found it desirable, to use a shutter with a plurality of, say four, blades, thus producing such frequent interruptions of the light that the appearance of flickering, which is now present in all pictures produced by motion picture projection, is absolutely and completely eliminated from the field of visibility.

Furthermore, by the use of the double elliptical gear drive, above described, a balanced effect is attained and pulsations avoided.

As is obvious, each drive is complete in itself and is capable of operating the machine, which arrangement may be of decided utility if a portion of the driving mechanism should become inoperative.

Having thus described my invention and illustrated its use, what I claim as new and desire to secure by Letters Patent is—

1. In an apparatus of the character referred to, in combination, means for supporting a strip of movable material and means for moving the material step-by-step comprising an intermittently acting driver, and a plurality of pairs of co-acting elliptical gears for imparting motion to said driver, all of such relative size and so arranged that the increment of the step-by-step motion is effected during a period of relatively accelerated motion of the periphery of one of said gears and thereby during a relatively short period of the cycle of operation of the intermittently acting driver, said pairs of gears being arranged to form a plurality of gear trains symmetrically connected to said driver.

2. In a device of the character described, in combination, a driving shaft, a pair of driving members on said shaft, a pair of spaced driven members actuated by said driving members, an auxiliary motion transmitting member between said spaced driving members, elliptical gears complementally connecting said driving members to said auxiliary motion transmitting member, an element to be intermittently moved, and an intermittent motion transmitting member connecting said last named element to said auxiliary motion transmitting member.

3. In a device of the character described, in combination, a driving shaft, a pair of driving members on said shaft, a driven member arranged to be intermittently driven, an intermediate constantly driven member intermittently actuating said driven member, and a plurality of trains of variable ratio gears symmetrically arranged with respect to said constantly driven member and forming a double train of gearing complemental to each of, and connected to said driving members.

4. In a device of the character described, in combination, a driving shaft, a pair of driving members on said shaft, a driven member arranged to be intermittently driven, an intermediate constantly driven member intermittently actuating said driven member, and a plurality of eccentric gears symmetrically arranged with respect to said constantly driven member and forming a double train of gearing complemental to each of, and connected to said driving members, said auxiliary driving members being of such size as will cause said intermittently driven member to be actuated by said constantly driven member during a period less than one-sixth of a cycle thereof.

5. In a device of the character described, in combination, a driving shaft, a pair of driving members on said shaft, a driven member arranged to be intermittently driven, an intermediate constantly driven member intermittently actuating said driven member, and a plurality of auxiliary driving elements, including multiple pairs of elliptical gears, symmetrically arranged with respect to said constantly driven member and forming a double train of gearing complemental to each of, and connected to said driving members.

6. In a device of the character described, in combination, a driving shaft, a pair of driving members on said shaft, a driven member arranged to be intermittently driven, an intermediate constantly driven member intermittently actuating said driven member, and a plurality of auxiliary driving elements, including multiple pairs of elliptical gears, symmetrically arranged with respect to said constantly driven member and forming a double train of gearing complemental to each of, and connected to said driving members, said elliptical gears being disposed relatively to said intermediate member whereby to cause an acceleration thereof during engagement with said intermittently driven member.

In testimony whereof I have hereunto signed my name.

FOREST RAY MOULTON.